United States Patent
Kolavennu et al.

(10) Patent No.: US 10,015,826 B2
(45) Date of Patent: Jul. 3, 2018

(54) ADAPTER DEVICE FOR COUPLING AN INDUSTRIAL FIELD INSTRUMENT TO AN INDUSTRIAL WIRELESS NETWORK

(71) Applicant: Honeywell International Inc., Morristown, NJ (US)

(72) Inventors: Soumitri N. Kolavennu, Blaine, MN (US); Alexander Chernoguzov, Warrington, PA (US); Robert Powell, Furlong, PA (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/746,071

(22) Filed: Jun. 22, 2015

(65) Prior Publication Data

US 2015/0289309 A1 Oct. 8, 2015

Related U.S. Application Data

(63) Continuation of application No. 13/331,638, filed on Dec. 20, 2011, now Pat. No. 9,065,813.

(60) Provisional application No. 61/454,177, filed on Mar. 18, 2011.

(51) Int. Cl.

| | |
|---|---|
| *H04W 84/18* | (2009.01) |
| *H04W 76/02* | (2009.01) |
| *H04L 29/06* | (2006.01) |
| *H04W 4/00* | (2018.01) |
| *H04L 12/24* | (2006.01) |
| *H04L 29/08* | (2006.01) |

(52) U.S. Cl.
CPC .......... *H04W 76/023* (2013.01); *H04L 69/08* (2013.01); *H04W 4/005* (2013.01); *G05B 2219/25198* (2013.01); *H04L 41/0806* (2013.01); *H04L 67/12* (2013.01)

(58) Field of Classification Search
CPC ... H04W 76/023; H04W 4/005; H04W 84/18; H04L 69/08
See application file for complete search history.

(56) References Cited

U.S. PATENT DOCUMENTS

| | | | |
|---|---|---|---|
| 5,027,288 A | 6/1991 | Suzuki et al. | |
| 5,361,336 A | 11/1994 | Atchison | |
| 5,903,455 A | 5/1999 | Sharpe, Jr. et al. | |
| 6,463,290 B1 | 10/2002 | Stilp et al. | |

(Continued)

FOREIGN PATENT DOCUMENTS

| | | |
|---|---|---|
| KR | 10 2005 0077105 A | 8/2005 |
| KR | 10 2009 0010515 A | 1/2009 |
| WO | WO 2009/154599 A1 | 12/2009 |

OTHER PUBLICATIONS

"ISA100 Wireless Module", www.wihartsystems.com, retrieved from the internet on Jun. 15, 2012, 3 pages.

(Continued)

*Primary Examiner* — Lakeram Jangbahadur

(57) ABSTRACT

A method includes coupling an adapter device to a field instrument in an industrial control system to provide a wireless communication capability to the field instrument. The method also includes converting, by the adapter device, information from a first protocol native to the field instrument into a second protocol native to a wireless network. The method further includes transmitting the information to at least one other device over the wireless network.

16 Claims, 5 Drawing Sheets

(56) References Cited

U.S. PATENT DOCUMENTS

| | | | |
|---|---|---|---|
| 6,603,977 B1 | 8/2003 | Walsh et al. | |
| 6,782,264 B2 | 8/2004 | Anderson | |
| 7,090,683 B2 | 8/2006 | Brock et al. | |
| 7,167,713 B2 | 1/2007 | Anderson | |
| 7,209,727 B2 | 4/2007 | Castaneda et al. | |
| 7,214,230 B2 | 5/2007 | Brock et al. | |
| 7,371,210 B2 | 5/2008 | Brock et al. | |
| 7,546,125 B2 | 6/2009 | Sharma et al. | |
| 7,567,785 B2 | 7/2009 | Tsai et al. | |
| 7,570,922 B2 | 8/2009 | Williams | |
| 7,654,957 B2 | 2/2010 | Abreu | |
| 7,656,271 B2 | 2/2010 | Ehrman et al. | |
| 7,688,820 B2 | 3/2010 | Forte et al. | |
| 7,701,913 B2 | 4/2010 | Chen et al. | |
| 7,760,905 B2 | 7/2010 | Rhoads et al. | |
| 7,819,859 B2 | 10/2010 | Prisco et al. | |
| 7,852,271 B2 | 12/2010 | Grunig et al. | |
| 7,965,664 B2 * | 6/2011 | Hodson | G05B 19/4185 370/310 |
| 7,978,062 B2 | 7/2011 | LaLonde et al. | |
| 8,112,565 B2 | 2/2012 | Russell, III et al. | |
| 8,229,576 B2 | 7/2012 | Kodama et al. | |
| 8,307,125 B2 | 11/2012 | Kodama | |
| 8,379,546 B2 | 2/2013 | Schleiss et al. | |
| 8,390,150 B2 * | 3/2013 | Vande Vusse | G05B 19/0423 307/112 |
| 2001/0038451 A1 | 11/2001 | Jung et al. | |
| 2001/0038453 A1 | 11/2001 | Jung et al. | |
| 2005/0125085 A1 | 6/2005 | Prasad et al. | |
| 2005/0206562 A1 | 9/2005 | Wilson et al. | |
| 2006/0036714 A1 | 2/2006 | Vuontisjarvi et al. | |
| 2006/0238159 A1 | 10/2006 | Jung | |
| 2006/0276143 A1 | 12/2006 | Anglin | |
| 2007/0103324 A1 | 5/2007 | Kosuge et al. | |
| 2007/0123249 A1 | 5/2007 | Sun | |
| 2007/0126576 A1 | 6/2007 | Script et al. | |
| 2007/0243830 A1 | 10/2007 | Isenmann et al. | |
| 2007/0262847 A1 | 11/2007 | Grabinger et al. | |
| 2007/0280144 A1 * | 12/2007 | Hodson | G05B 19/4185 370/312 |
| 2007/0280178 A1 | 12/2007 | Hodson et al. | |
| 2008/0052039 A1 | 2/2008 | Miller et al. | |
| 2008/0094631 A1 | 4/2008 | Jung et al. | |
| 2008/0155064 A1 | 6/2008 | Kosuge et al. | |
| 2008/0273486 A1 | 11/2008 | Pratt et al. | |
| 2008/0274766 A1 | 11/2008 | Pratt et al. | |
| 2009/0010203 A1 * | 1/2009 | Pratt, Jr. | H04L 12/66 370/328 |
| 2009/0010233 A1 | 1/2009 | Pratt, Jr. et al. | |
| 2009/0073423 A1 | 3/2009 | Jung et al. | |
| 2009/0296601 A1 | 12/2009 | Citrano, III et al. | |
| 2009/0316628 A1 * | 12/2009 | Enns | H04L 12/40006 370/328 |
| 2010/0036511 A1 | 2/2010 | Dongare | |
| 2010/0099390 A1 | 4/2010 | Vendrow et al. | |
| 2010/0145476 A1 | 6/2010 | Junk et al. | |
| 2010/0190442 A1 | 7/2010 | Citrano, III et al. | |
| 2010/0290351 A1 | 11/2010 | Toepke et al. | |
| 2011/0068906 A1 | 3/2011 | Shafer et al. | |
| 2011/0187490 A1 * | 8/2011 | Nakamoto | G05B 19/418 340/3.9 |
| 2011/0228725 A1 | 9/2011 | Nakamoto et al. | |
| 2012/0041744 A1 | 2/2012 | Kantzes et al. | |
| 2012/0084400 A1 | 4/2012 | Almadi et al. | |
| 2012/0230446 A1 | 9/2012 | Feng | |
| 2012/0236768 A1 | 9/2012 | Kolavennu et al. | |
| 2012/0316686 A1 | 12/2012 | Dueckman | |

OTHER PUBLICATIONS

Derek Benz, "Industrial Wireless: Implementation Success Factors", Control Engineering Asia, Apr. 2009, 12 pages.

"UDC3500 Universal Digital Controller", Honeywell Process Solutions, Mar. 2007, 16 pages.

"Honeywell Announces New Infrared Technology Designed to Help Contractors Save Time and Money", News Release, AutomatedBuildings.com, Mar. 2006, 2 pages.

Frank Golatowski, et al., "Service-Oriented Software Architecture for Sensor Networks", 2003, 3 pages.

Robert Powell, "Method for Wirless Device Location Using Automatic Location Update Via a Provisioning Device and Related Apparatus and System", U.S. Appl. No. 13/272,728, filed Oct. 13, 2011.

Notification of Transmittal of the International Search Report and the Written Opinion of the International Searching Authority, or the Declaration dated Mar. 19, 2013 in connection with International Patent Application No. PCT/US2012/058620.

"3M Electronic Marker System (EMS) Ball Markers", Product information by 3M retrieved Nov. 30, 2013 online http://multimedia.3m.com.

Communication pursuant to Article 94(3) EPC dated Oct. 7, 2014 in connection with European Patent Application No. 12760515.2; 5 pages.

Notification of Transmittal of the International Search Report and the Written Opinion of the International Searching Authority, or the Declaration dated Apr. 27, 2012 in connection with International Patent Application No. PCT/US2012/029338.

Foreign Communication From a Related Counterpart Application, European Application No. 12760515.2-1853, Communication Pursuant to Article 94(3) EPC dated May 11, 2017, 6 pages.

* cited by examiner

ADAPTER DEVICE FOR COUPLING AN INDUSTRIAL FIELD INSTRUMENT TO AN INDUSTRIAL WIRELESS NETWORK

CROSS-REFERENCE TO RELATED APPLICATIONS AND PRIORITY CLAIM

This application is a continuation of U.S. patent application Ser. No. 13/331,638 filed on Dec. 20, 2011 (now U.S. Pat. No. 9,065,813), which claims priority under 35 U.S.C. § 119(e) to U.S. Provisional Patent Application No. 61/454,177 filed on Mar. 18, 2011. Both of these applications are hereby incorporate by reference.

TECHNICAL FIELD

This disclosure relates generally to industrial control systems. More specifically, this disclosure relates to an adapter device for coupling an industrial field instrument to an industrial wireless network and related system and method.

BACKGROUND

Industrial control and automation systems are often used to automate large and complex industrial processes. These types of systems routinely include wireless networks that facilitate communications with a wide range of industrial field devices. The field devices can include wireless sensors, wireless actuators, and wireless controllers. There are multiple industrial wireless network protocols being developed. One example wireless network protocol being developed is the ISA100.11a protocol.

In some circumstances, users may need to operate field instruments using different protocols for the same application, and these instruments may need to communicate with each other. Since different wireless protocols are used, users are often forced to have multiple wireless networks that communicate with a common wired control system. This typically requires separate wireless infrastructures for each wireless protocol. For example, an ISA100.11a network and a Wireless Highway Addressable Remote Transducer or "W-HART" network (each with its own communication and management infrastructure) may both be required if a user wants to use a combination of ISA100.11a and W-HART instruments for an application.

SUMMARY

This disclosure provides an adapter device for coupling an industrial field instrument to an industrial wireless network and related system and method.

In a first embodiment, a method includes coupling an adapter device to a field instrument in an industrial control system to provide a wireless communication capability to the field instrument. The method also includes converting, by the adapter device, information from a first protocol native to the field instrument into a second protocol native to a wireless network. The method further includes transmitting the information to at least one other device over the wireless network.

In a second embodiment, an apparatus includes a first interface configured to communicate with a field instrument in an industrial control system. The apparatus also includes a second interface configured to communicate with at least one device over a wireless network. In addition, the apparatus includes a controller configured to convert information from a first protocol native to the field instrument into a second protocol native to the wireless network and to transmit, via the second interface, the information to the at least one other device over the wireless network.

In a third embodiment, a system includes a field instrument in an industrial control system and an adapter device configured to provide a wireless communication capability to the field instrument. The adapter device includes a first interface configured to communicate with the field instrument. The adapter device also includes a second interface configured to communicate with at least one device over a wireless network. In addition, the adapter device includes a controller configured convert information from a first protocol native to the field instrument into a second protocol native to the wireless network and to transmit, via the second interface, the information to the at least one other device over the wireless network.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
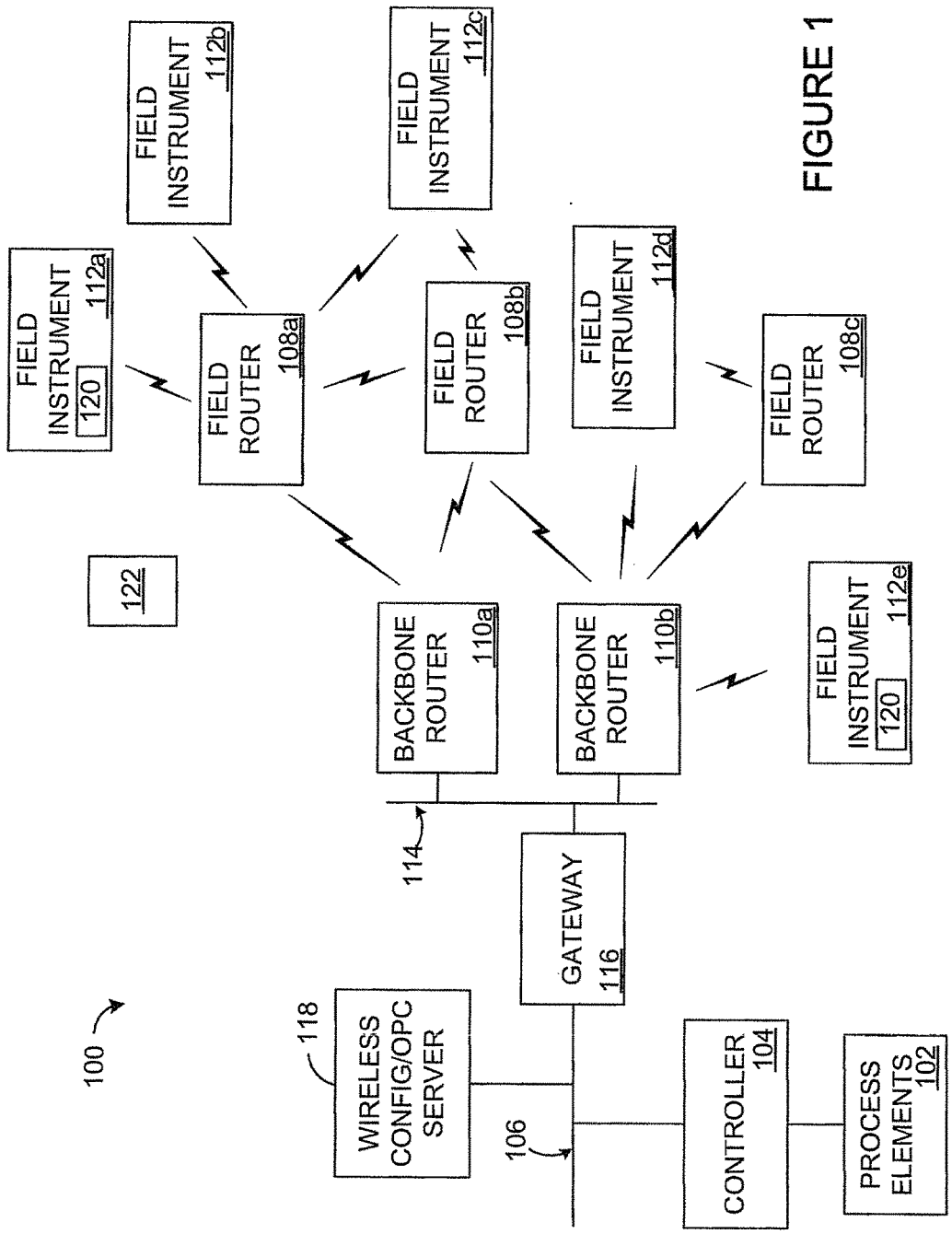
FIG. 1 illustrates an example industrial control and automation system according to this disclosure.

FIG. 1 illustrates an example industrial control and automation system 100 according to this disclosure. As shown in FIG. 1, the system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system represents any system or portion thereof configured to process one or more materials in some manner.

A controller 104 is coupled to the process elements 102. The controller 104 controls the operation of one or more of the process elements 102. For example, the controller 104 could receive information associated with the process system, such as sensor measurements from some of the process elements 102. The controller 104 could use this information to generate control signals for others of the process elements 102 such as actuators, thereby adjusting the operation of those process elements 102. The controller 104 includes any suitable structure for controlling one or more process elements 102. The controller 104 could, for example, represent a computing device executing a MICROSOFT WINDOWS or suitable real-time operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks, all or a portion of a global network, or any other communication system(s) at one or more locations. As a particular example, the network 106 could include a FAULT TOLERANT ETHERNET network from HONEYWELL INTERNATIONAL INC.

The system 100 also includes one or more industrial wireless networks for communicating with wireless sensors or other wireless field devices. In the example shown in FIG. 1, an industrial wireless network includes field routers 108a-108c and backbone routers 110a-110b. The field routers 108a-108c and backbone routers 110a-110b wirelessly communicate with each other to form a wireless network, such as a mesh network. For example, the field routers 108a-108c could receive data transmitted wirelessly from field instruments 112a-112e and route the data to the backbone routers 110a-110b. The backbone routers 110a-110b could receive data from the field routers 108a-108c directly or indirectly (such as through other field routers) and directly or indirectly from the field instruments 112a-112e for transmission over a backbone network 114. The field routers 108a-108c and backbone routers 110a-110b could also route data received over the backbone network 114 to the field instruments 112a-112e. In this way, the field routers 108a-108c and backbone routers 110a-110b form a network that can provide wireless coverage to field instruments and other devices in a specified area, such as a large industrial complex. The wireless network can support any suitable industrial wireless network protocol(s), such as ISA100.11a.

In this example, the field routers 108a-108c and backbone routers 110a-110b generally represent routing devices that store and forward messages for other devices and that are typically line-powered, meaning these devices receive operating power from external sources (such as AC supply lines). However, a field or backbone router could represent a device powered by a local power supply, such as an internal battery (referred to as locally-powered). The field instruments 112a-112e generally represent non-routing devices that are routinely locally-powered, although a field instrument could provide routing functionality or be line-powered.

Each field router 108a-108c and backbone router 110a-110b includes any suitable structure facilitating wireless communications, such as a radio frequency (RF) frequency-hopping spread spectrum (FHSS) or direct sequence spread spectrum (DSSS) transceiver. Each of the backbone routers 110a-110b also includes any suitable structure facilitating communication over the backbone network 114, such as an Ethernet transceiver. The backbone network 114 includes any suitable network for transporting data, such as a FAULT TOLERANT ETHERNET network, a wireless mesh network, or other wired or wireless network.

A gateway 116 couples the network 106 and the backbone network 114. The gateway 116 can perform security functions to allow only authorized traffic to flow between the networks 106 and 114. The gateway 116 can also perform translation functions to translate between protocols. The gateway 116 includes any suitable structure for providing access to networks and translating between protocols used by those networks.

A wireless configuration and OLE for Process Control (OPC) server 118 can configure and control various aspects of the system 100. For example, the server 118 could configure the operation of the field routers 108a-108c, backbone routers 110a-110b, and field instruments 112a-112e. The server 118 could also support security in the system 100, such as by distributing cryptographic keys or other security data to various wireless devices or other components. The server 118 includes any suitable structure for configuring wireless networks and providing security information.

In particular embodiments, various devices in the wireless network of FIG. 1 form a mesh network communicating at 2.4 GHz or 5.8 GHz. Also, in particular embodiments, data can be injected into the wireless mesh network through the routers or field instruments, thus providing versatile, multi-functional, plant-wide coverage for wireless sensing, asset location tracking, personnel tracking, wireless communications, and any other or additional functionality as desired.

In one aspect of operation, at least one of the field instruments 112a-112e may lack the ability to communicate over the wireless network using the appropriate wireless network protocol. For example, at least one of the field instruments 112a-112e could be a legacy field device that previously was not equipped with the specified communication capability. Alternatively, the field instrument could communicate using a Highway Addressable Remote Transducer (HART), wireless HART (W-HART), or other field instrument protocol, and the wireless network could support an ISA100.11a or other industrial wireless network protocol. To allow that field instrument to communicate over the wireless network, an adapter device 120 can be provided. An adapter device 120 communicates with an associated field instrument 112a-112e to obtain outgoing data from or provide incoming data to the field instrument. The adapter device 120 also wirelessly transmits the outgoing data or wirelessly receives the incoming data over the wireless network using the appropriate wireless network protocol. Additionally, the adapter device 120 can be configured to convert (i.e., translate) a protocol used by the field instrument 112a-112e into a protocol used by the wireless network. In this way, the adapter device 120 allows a HART, W-HART, or other field instrument to communicate within an ISA100.11a or other wireless network, without the need for communication and network management infrastructures supporting multiple wireless protocols.

In particular embodiments, the adapter device 120 supports the ISA100.11a communication protocol and couples to a HART or W-HART field instrument through a two-wire, 4-20 mA wired communication modem. Through this connection, the adapter device 120 is able to read HART application data from the field instrument. This data then can be transported over an ISA100.11a communication layer. All HART and W-HART devices are required to provide this interface for provisioning and handheld reader support. This functionality can be achieved through the definition of a common-practice user layer HART interface object for field instruments. The HART interface object can be contained within an ISA100.11a user application process (UAP).

In particular embodiments, the adapter device 120 receives a unique identifier associated with its associated field instrument 112a-112e. The unique identifier identifies the field instrument 112a-112e and can be used by the network to identify where on the network the field instrument 112a-112e is located. The adapter device 120 also can transmit the unique identifier along with a protocol attribute. The protocol attribute is configured to inform other devices on the wireless network which protocol the field instrument 112a-112e is using. For example, the protocol attribute could reference that the field instrument 112a-112e is a HART device. Thereafter, any device on the network needing to communicate with a HART device can determine which devices are HART devices and where the HART devices are located on the network.

A field instrument 112a-112e on a standard wired HART interface is often limited to (i) a query/response mechanism using HART-based commands and (ii) an unsolicited response mode transmission referred to as HART burst mode where the field device periodically sends process data at a predetermined update rate. These communication methods were designed and optimized for data transfer over a two-wire master/slave communication interface. The HART-based protocol did not consider transport or network services and in many cases combined the application layer features to control physical layer aspects. As a result, simply encapsulating a HART protocol into the ISA100.11a protocol does not achieve the desired addressing, efficiency, and functionality for a distributed wireless network. By using an interface object to interface a HART field instrument 112a-112e onto a wireless network, the HART field instrument 112a-112e can be provided with the necessary and standard ISA100.11a features and services for network communications. These features and services include the ability for the interface to be identified as a standard ISA100.11a addressable object with standard ISA100.11a application services of read, write, publish, subscribe, and method execution.

In some embodiments, external devices can be connected through an interface to access the interface object using ISA100.11a services to invoke specific functions exposed by a HART proxy host application executing in the adapter device. These functions can include open, send, receive, and close.

The open function can instruct the HART application associated with the selected interface to prepare the HART interface for communication. This may include checking that a HART device is connected and determining the unique identifier for data transactions. The send operation can instruct the application associated with the selected interface to send a specific command to the connected HART device. The send operation could be blocking (where it waits for a response before returning) or non-blocking (where it returns with an acknowledgement that the command was successfully sent and the response can be returned by polling with a receive operation). The close operation can instruct the application associated with the selected interface to terminate communication with the field device and possibly put the interface in a low power state. By use of these exposed functions, an application running in a handheld or other device can utilize the interface object as a remote modem interface to send and receive without the need to be concerned with HART protocol features such as preambles, bus arbitration, device discovery, and other data and physical layer features. In this way, the HART protocol is not used over the interface, but instead only the HART commands and HART response data are transferred by using ISA100.11a standard services by means of the functions and attributes exposed by the interface object.

The adapter device 120 can also support an ISA100.11a object or some other object associated with a different wireless network protocol. An ISA100.11a object could provide access over the wireless network to a remote HART modem or other interface using remote methods that are implemented in the ISA100.11a object. The adapter device 120 also allows mapping of standard ISA100.11a object types (such as analog input (AI), analog output (AO), digital input (DI), and digital output (DO)) to standard HART or other field instrument protocol object types (such as primary variable (PV), secondary variable (SV), tertiary variable (TV), and quaternary variable (QV)). This allows the object types to be published and shared amongst not only HART devices but also other devices on the ISA100.11a network using true peer-to-peer publisher-subscriber services.

Using this functionality, a rich information model that contains a converged, interoperable user layer supporting existing user layer application concepts can be used to provide a common and comprehensive information view. This approach is sufficient to support a wide variety of process control applications, such as sensing, actuation, and control in the field. Block-oriented processes that are richer and better can be used to support the view of both enterprise semantics (such as those defined by ISA100.11a) and command-oriented application processes (such as defined by HART) to meet the needs of older conventional systems via a single common user layer, application protocol, and communication stack. Because of the commonality of access, the unified user layer also promotes the deployment of simplified end-to-end analysis applications that require less programming and less conversion overhead.

In this example, only two of the field instruments 112a and 112e are associated with adapter devices 120. The adapter devices 120 could perform a range of functions for the instruments 112a and 112e, from merely reading process variable (PV) data and transmitting it wirelessly to full two-way interaction and control. The remaining field instruments 112b-112d may natively support a wireless protocol used by the wireless network and not need an adapter device 120. Note, however, that this is for illustration only.

Each adapter device 120 includes any suitable structure for coupling to a field instrument and supporting communications using a wireless protocol. Each adapter device 120 could have one of multiple form factors depending on its use. For instance, an adapter device 120 could be a separate device physically mounted on a field instrument, a separate device tethered to a field instrument by a cable or other communication link, or an integrated device within a field instrument.

Although FIG. 1 illustrates one example of an industrial control and automation system 100, various changes may be made to FIG. 1. For example, the system 100 could include any number of each component. Also, the functional division shown in FIG. 1 is for illustration only. Various components in FIG. 1 could be combined, subdivided, or omitted and additional components could be added according to particular needs. Further, while the wireless network is illustrated as being used along with a wired controller 104 and wired process elements 102, one or more wireless networks could be used in a system without wired control elements. In addition, FIG. 1 illustrates one example operational environment where an adapter device 120 supporting field instrument communications over a wireless network can be used. This functionality could be used in any other suitable system.

Figure 2:
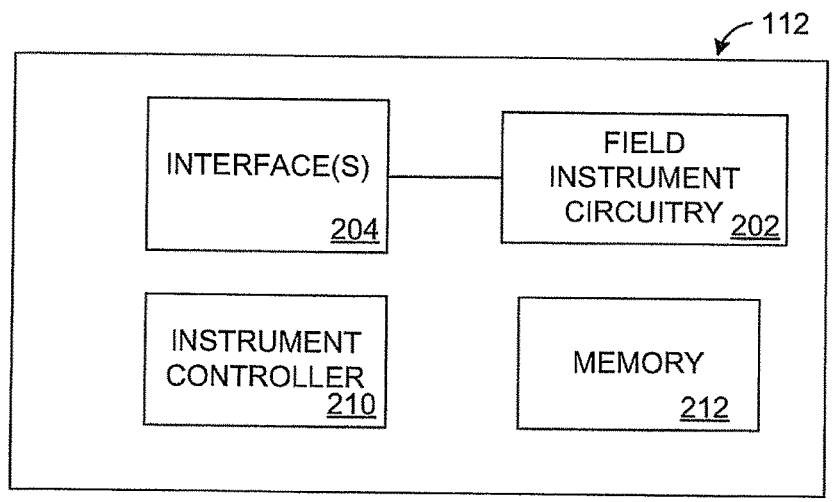
FIG. 2 illustrates an example field instrument according to this disclosure.

FIG. 2 illustrates an example field instrument 112 according to this disclosure. The field instrument 112 could be used in the system 100 of FIG. 1 or in any other suitable system.

As shown in FIG. 2, the field instrument 112 includes field instrument circuitry 202. The circuitry 202 generally performs the industrial control/automation function(s) of the field instrument 112. For example, the circuitry 202 could include sensing and signal processing circuitry within an industrial process sensor. The circuitry 202 could also include actuating circuitry for making adjustments to an industrial process within an industrial actuator. The circuitry 202 could further include processing circuitry for determining how to adjust an industrial process within a process controller. Any other or additional circuitry 202 supporting any other or additional functions could be used in the field instrument 112.

The field instrument 112 also includes at least one interface 204. The interface 204 supports communications between the field device circuitry 202 and another device coupled to the field instrument 112. The interface 204 could, for example, retrieve outgoing data to be transmitted from the circuitry 202 and provide that data to the coupled device. The interface 204 could also provide incoming data received from the coupled device to the circuitry 202. The interface 204 includes any suitable structure for supporting communications of data between components. In particular embodiments, the interface 204 could support any suitable protocol for interacting with a field instrument, such as the highway addressable remote transducer (HART) or wireless HART (W-HART). In other embodiments, the interface 204 includes a serial interface. Note that any other suitable interface(s) could be used, depending on the industrial field device protocol(s) used by the field instrument 112.

The field instrument 112 further includes a controller 210, which controls the overall operation of the instrument 112. For example, the controller 210 could control the communication of data to and from the coupled device. The controller 210 could also control the process control/automation functionality performed by the field instrument 112. In addition, the controller 210 could execute the functionality associated with HART interface objects or interface objects for other field device protocols as described below. The controller 210 includes any suitable structure for controlling operation of a field instrument. As particular examples, the controller 210 could represent a processor, microprocessor, microcontroller, field programmable gate array, digital signal processor, or other processing or control device(s).

A memory 212 is coupled to the controller 210. The memory 212 stores any of a wide variety of information used, collected, or generated by the field instrument 112. For example, the memory 212 could store information transmitted over or received from a wireless network. The memory 212 includes any suitable volatile and/or non-volatile storage and retrieval device(s).

Although FIG. 2 illustrates one example of a field instrument 112, various changes may be made to FIG. 2. For example, the field instrument 112 could include any number of each component. Also, the functional division shown in FIG. 2 is for illustration only. Various components in FIG. 2 could be combined, subdivided, or omitted and additional components could be added according to particular needs.

Figure 3:
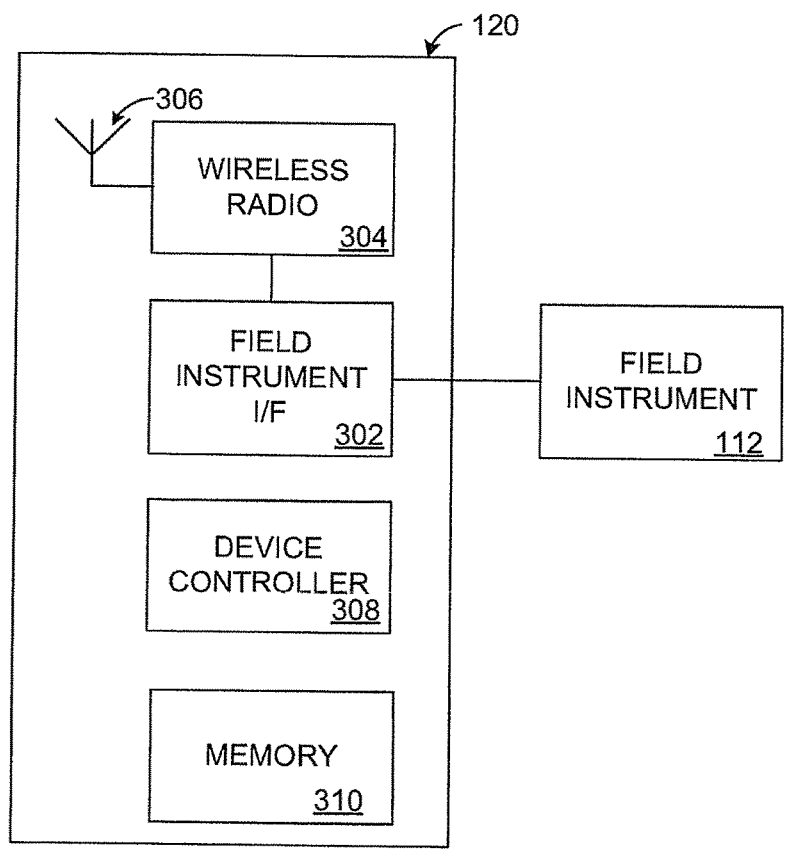
FIG. 3 illustrates an example adapter device according to this disclosure.

FIG. 3 illustrates an example adapter device 120 according to this disclosure. The adapter device 120 could be used in the industrial control and automation system 100 of FIG. 1 or in any other suitable system.

As shown in this example, the adapter device 120 includes a field instrument interface (I/F) 302. The interface 302 supports communications with at least one field instrument 112. The interface 302 could, for example, retrieve outgoing data to be transmitted wirelessly from the field instrument 112. The interface 302 could also provide incoming data received wirelessly to the field instrument 112. The interface 302 includes any suitable structure for communicating with a field instrument 112. In particular embodiments, the interface 302 includes a two-wire, 4-20 mA wired communication modem for coupling to a HART or W-HART field instrument. In other embodiments, the interface 302 includes a serial interface. Note that any other suitable interface(s) could be used, such as an inter-processor Serial Communication Interface (SCI). This can provide a way for a field instrument vendor to create a field instrument that is compatible with the HART command set and that is accessible over the ISA100.11a network, without the need for a wired HART interface. By doing so, a battery-powered wireless field instrument can be designed that supports HART commands as a basis for application data access.

A wireless radio 304 is coupled to an antenna 306. The wireless radio 304 and antenna 306 can be used to communicate wirelessly with one or more field or backbone routers in a wireless network. The wireless radio 304 supports the necessary protocol(s) for communicating over an industrial wireless network. The wireless radio 304 includes any suitable structure for providing signals for wireless transmission and/or for obtaining signals received wirelessly. The antenna 306 represents any suitable structure for transmitting and/or receiving wireless signals. In some embodiments, the wireless radio 304 represents an RF transceiver, such as an RF FHSS or DSSS transceiver. As a particular example, the wireless radio 304 could be implemented using a FREESCALE or MSP430 processor. Also, the antenna 306 could represent an RF antenna. Note that any other suitable wireless signals could be used to communicate and that the wireless radio could include a transmitter and a separate receiver.

The adapter device 120 further includes a controller 308, which controls the overall operation of the adapter device 120. For example, the controller 308 could control the communication of data to and from the field instrument 112. The controller 308 could also control the communication of data to and from the wireless radio 304. In addition, the controller 308 could execute the functionality associated with HART interface objects (or interface objects associated with other field instrument protocols) in order to support adapter or translation functionality. The controller 308 includes any suitable structure for controlling operation of an adapter device 120. As particular examples, the controller 308 could represent a processor, microprocessor, microcontroller, field programmable gate array, digital signal processor, or other processing or control device(s).

A memory 310 is coupled to the controller 308. The memory 310 stores any of a wide variety of information used, collected, or generated by the adapter device 120. For example, the memory 310 could store information received over a wireless network that is to be transmitted to a field instrument or vice versa. The memory 310 includes any suitable volatile and/or non-volatile storage and retrieval device(s).

While not shown, the adapter device 120 could include any suitable source(s) of operating power. For example, the adapter device 120 could be powered by an internal power supply, such as a battery, fuel cell, or solar cell. Instead of, or in addition to, an internal power supply, the adapter device 120 could be designed to scavenge power through the interface 302.

In some embodiments, an adapter device 120 can be integrated into a field instrument 112. In these embodiments, the components of the adapter device 120 in FIG. 3 could represent components already present in the field instrument 112, such as in the interfaces 204 of the field instrument 112. In that case, the components in the field instrument 112 could be upgraded or replaced to support the use of the appropriate interface objects and wireless network protocols.

In one aspect of operation, at least one field instrument includes or is coupled to an adapter device 120 that supports (i) local configuration and monitoring of the field device; (ii) provisioning of the field device onto the wireless network; and (iii) communication of data between the field instrument and other devices through the wireless network. The adapter device 120 can support out-of-band (OOB) communications, meaning the communications occur outside of the wireless network. The adapter device 120 can also support the local update or translation of a foreign protocol for the field instrument 112, such as when the field instrument 112 is a legacy protocol device. The adapter device 120 allows a user device, such as a personal digital assistant (PDA) or other handheld/portable device, to interact with the field instrument 112 and to configure the adapter device 120 to communicate with the field instrument 112, as well as to configure and provision the field instrument 112 onto the wireless network.

In some embodiments, the adapter device 120 can be a self-contained adapter configured to couple to and to provide a communication capability, such as wireless communication capability, to a legacy field instrument 112 that previously was not equipped with the specified communication capability. For example, the adapter device 120 can be a one-wireless-adapter (OWA) that can provide a wireless communication capability to the field instrument 112. The adapter device 120 could also use any suitable technology to communicate with an external device. For instance, the adapter device 120 could include an infrared interface, a radio interface, or other wireless interface or a wired interface.

Although FIG. 3 illustrates one example of an adapter device 120, various changes may be made to FIG. 3. For example, the adapter device 120 could include any number of each component. Also, the functional divisions shown in FIG. 3 are for illustration only. Various components in FIG. 3 could be combined, subdivided, or omitted and additional components could be added according to particular needs.

Figure 4:
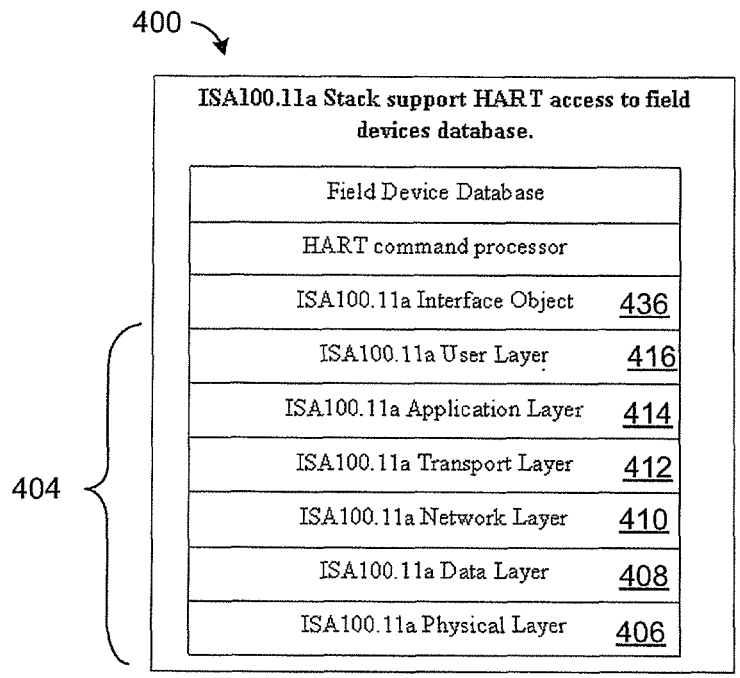
FIG. 4 illustrates an example protocol stack in an adapter device in an industrial control and automation system according to this disclosure.

FIG. 4 illustrates an example protocol stack 400 in an adapter device 120 in an industrial control and automation system according to this disclosure. In particular, FIG. 4 illustrates a protocol stack 400 supporting the use of the ISA100.11a protocol for HART field device data access. Of course, the interface object extension to the ISA100.11a stack can be implemented using other field device command processors. The protocol stack can vary depending on the wireless communication mechanism used.

As shown in FIG. 4, the protocol stack 400 is associated with the adapter device 120 attached to the field instrument 112. In some embodiments, when the adapter device 120 is an internal component of the field instrument 112, the protocol stack 400 is associated with the field instrument 112.

In this example, the protocol stack 400 includes various layers 404 supporting the ISA100.11a protocol. The layers 404 include a physical layer 406, a data layer 408, a network layer 410, and a transport layer 412 (which could support the standard OSI model functions). The layers 404 also include an application layer 414, which can include an application sub-layer, and a user process layer 416. The application layer 414 provides a level of abstraction by making it unnecessary for higher layers to know what types of services are available at the transport level and the extent of services available at that level. The application layer 414 also executes various applications that communicate with each other and with lower layers. The user process layer 416 provides an additional layer for higher-level applications.

The protocol stack 400 further includes various objects for managing different aspects of the field instrument 112. For example, objects are used to manage the field instrument 112, security for the field instrument 112, and user applications executed by the field instrument 112, respectively. Also, an interface object 436 facilitates the use of a foreign protocol instrument application in the field instrument 112. Here, the communication interface to the application layer 414 allows local access to both native objects and non-ISA100.11a protocol applications by use of the foreign device interface object 436.

In some embodiments, the adapter device 120 includes a host proxy configured to communicate with another proxy, such as a proxy in another adapter device 120 or a proxy application on an external device. The host proxy can negotiate communication such as transmission of PV information periodically. The host proxy can also negotiate a contract for scheduled responses to queries. For example, the adapter device 120 can send responses at scheduled intervals in an optimized mode such that the entire packet of information is not sent, but rather a short-hand version of the packet is sent.

Also, in some embodiments, a provisioning tool configures the adapter device 120 to manage wireless communications for the field instrument 112. Therefore, the field instrument 112 sees the adapter device 120 as a legacy interface (such as a wired interface) and communicates normally, while the adapter device 120 communicates the information wirelessly. The adapter device 120 can translate the information (e.g., protocol) from the legacy field instrument 112 into a protocol best optimized for transmission on the wireless network at that time. Therefore, the adapter device 120 can provide methods for exposing communications onto the network such that any legacy field instrument 112 can be incorporated onto the wireless network. As such, the legacy field instrument 112 talks as a native device on the wireless network. The legacy field device 112 through the adapter device 120 can send PV information to any other instrument 112 in a standard form. The adapter device 120 converts the protocol of the legacy field device 120 into the standard form, such as HART to MODBUS. Once the adapter device 120 converts the information from the legacy field instrument 112 into the native wireless protocol, the information can be translated into any other protocol by other adapter devices 120, field instruments 112, and so forth.

Moreover, in some embodiments, a provisioning tool can host other applications that allow an operator to configure a field instrument using a legacy protocol. That is, the provisioning tool can transmit information to the adapter device 120, which strips the information to the bare application information and communicates the bare application information to the legacy field instrument 112. Therefore, the provisioning tool can communicate through the adapter device 120 to configure the legacy field instrument 112, regardless of the legacy protocol utilized by the field instrument 112. Accordingly, the adapter device 120 accepts commands from the provisioning tool in order to provision the adapter device to communicate with the legacy field instrument 112 as well as to provision the adapter device 120, and the associated legacy field instrument 112, onto the wireless network.

In addition, in some embodiments, the adapter device 120 can send the unique ID of the legacy field instrument 112 as an attribute on the interface object 436. This allows the gateway 116 to identify the field instrument 112 as well as the protocol of the field instrument 112. The gateway 116 further can map the location of the field instrument 112 on the network based on the unique ID and protocol type of the field instrument 112. That is, the gateway 116 can indicate an address of the field instrument 112 and that the field instrument 112 is a HART device. Therefore, any other device on the system 100 can find the field instrument 112, such as when looking for a HART device.

Although FIG. 4 illustrates one example of a protocol stack 400 in an adapter device 120 in an industrial control and automation system, various changes may be made to FIG. 4. For example, as noted above, the use of ISA100.11a is for illustration only. Also, any other or additional layers could be used in the adapter device 120 to support the various functions of the adapter device 120.

Figure 5:
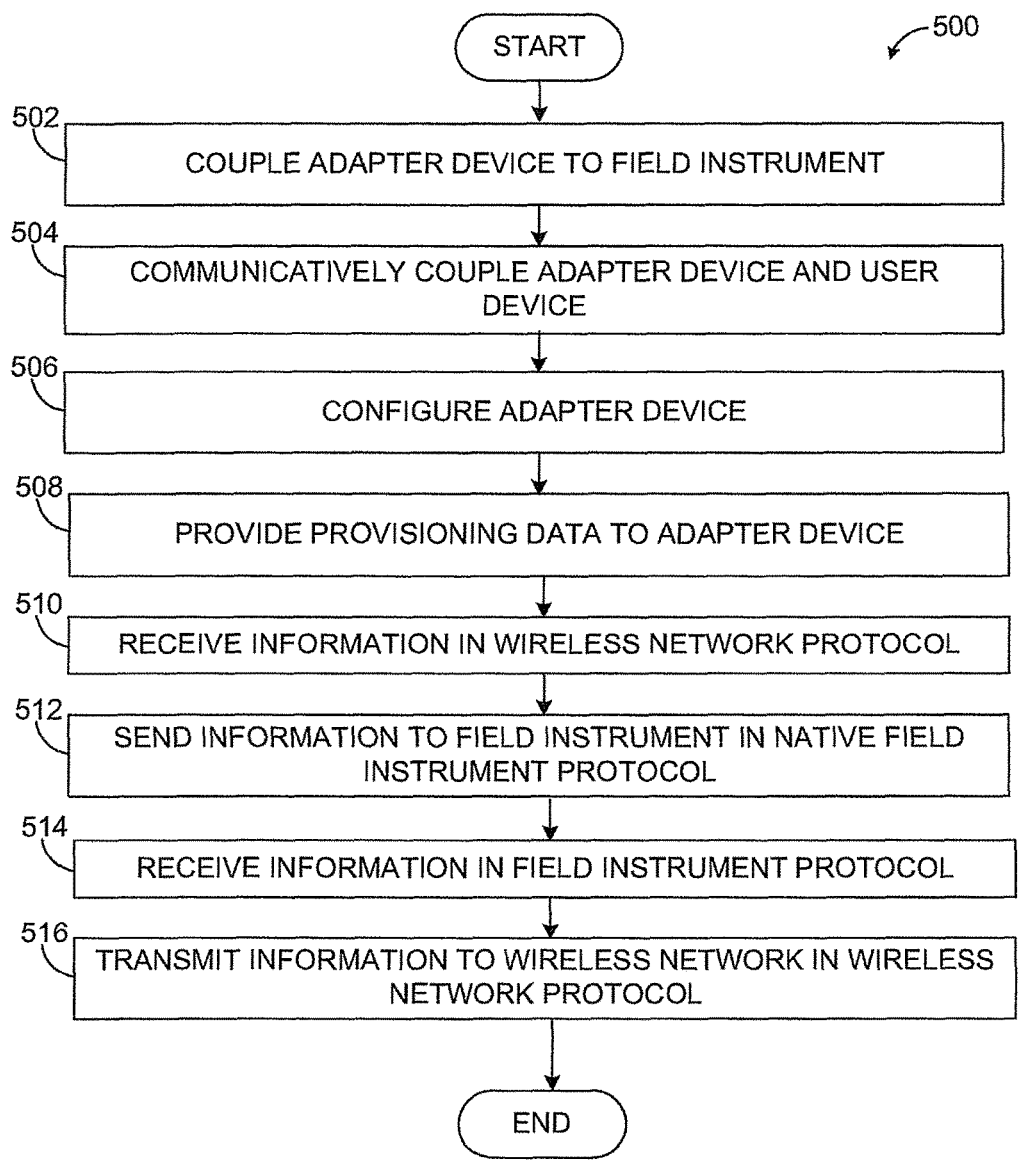
FIG. 5 illustrates an example method for configuring and provisioning an adapter device via a user device according to this disclosure.

FIG. 5 illustrates an example method 500 for configuring and provisioning an adapter device 120 via a user device according to this disclosure. As shown in FIG. 5, an adapter device 120 is coupled a field instrument 112 at step 502. This could include initiating a wired communication link between the adapter device 120 and the field instrument 112 using interface 204.

At step 504, the adapter device 120 is communicatively coupled to a user device. This could include, for example, physically coupling a provisioning device to the adapter device 120 using a wired interface. This could also include initiating an infrared or other wireless communication session between the provisioning device and the adapter device 120 using a wireless radio 304.

The adapter device 120 is configured at step 506. This could include, for example, an operator selecting an operating mode, such as a configuration mode, of the provisioning device. In the configuration mode, the provisioning device configures the adapter device 120 to communicate with the field instrument 112. For example, the provisioning device can configure the adapter 112 to communicate with the field instrument 112 using a protocol native to the field instrument 112.

Provisioning data is provided to the adapter device 120 at step 508. This could include, for example, the operator selecting an operating mode, such as a provisioning mode, of the provisioning device. When running in the provisioning mode, the provisioning device communicates provisioning data, such as a wireless network identifier and wireless security credentials, to the adapter device 120. As part of the provisioning, the provisioning device may or may not communicate an identified location to the adapter device 120.

At step 510, the adapter device 120 receives communications from the wireless network. This can include receiving information in a protocol configured for the wireless network. The adapter device 120 converts the information into a field instrument protocol native to the field instrument 112 at step 512. At step 514, the adapter device 120 receives information from the field instrument 112 in the field instrument protocol. The adapter device 120 converts the information into the wireless network protocol in step 516.

Although FIG. 5 illustrates one example of a method 500 for configuring and provisioning an adapter device 120 via a user device, various changes may be made to FIG. 5. For example, while shown as a series of steps, various steps in FIG. 5 could overlap, occur in parallel, occur multiple times, or occur in a different order.

Figure 6:
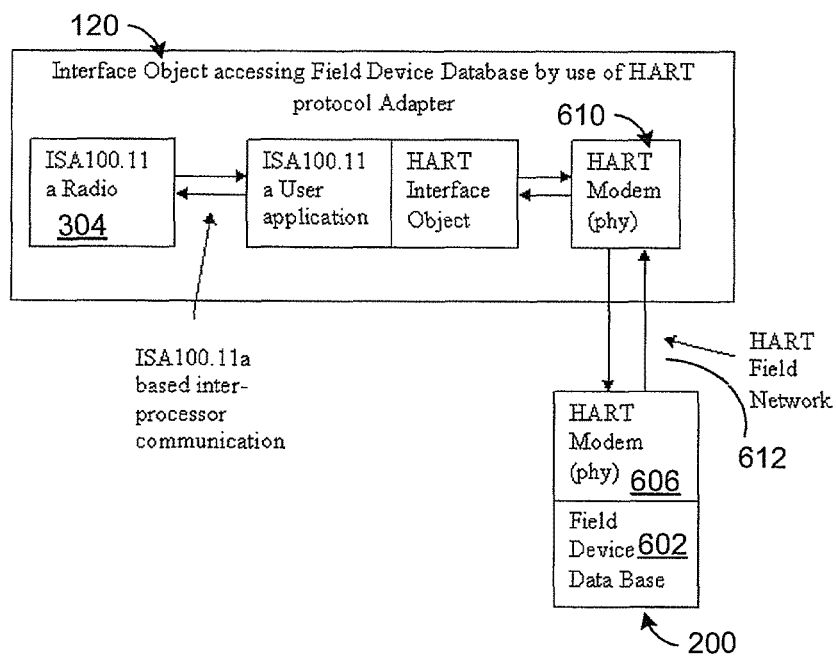
FIGS. 6 through 8 illustrate example techniques for accessing data from a field device using a HART command set according to this disclosure.
Figure 7:
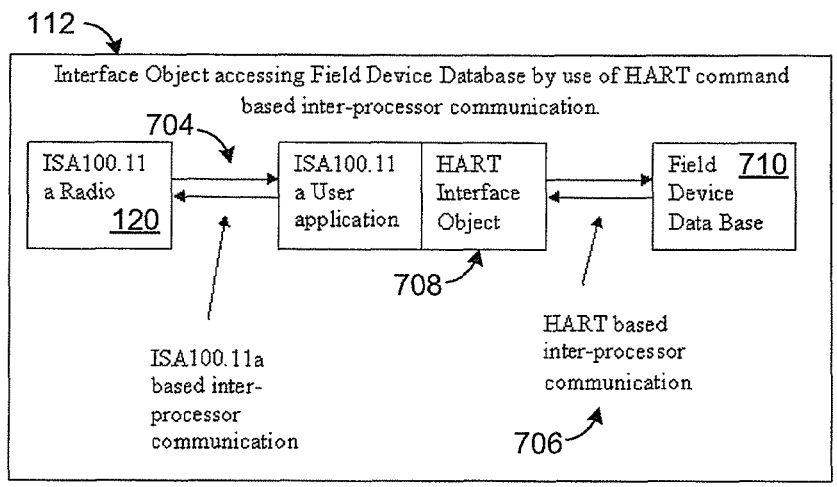
Figure 8:
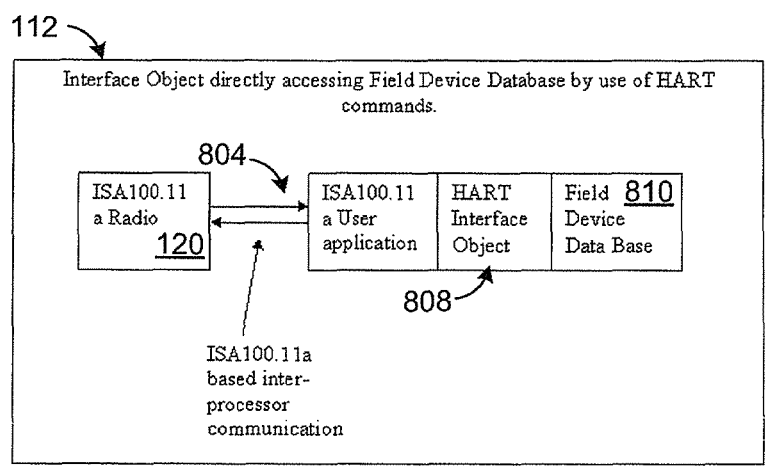

FIGS. 6 through 8 illustrate example techniques for accessing data from a field instrument 112 using a HART command set according to this disclosure. Note that other field instrument 112 protocols could be supported by the adapter device 120 and field instrument 112.

In the example illustrated in FIG. 6, an interface object accesses a field device database 602 by use of a HART protocol adapter 120. The adapter 120 is configured to provide a wireless communication capability to the field instrument 112. In this example, the field instrument 112 includes a HART modem 606, and the adapter 120 includes the radio 304 and a HART modem 610. The adapter 120 can be coupled to the field instrument 112 via a HART field network 612 established between the HART modems 606 and 610.

In the example illustrated in FIG. 7, an interface object accesses a field device database 710 using inter-processor communications. The communications can be HART-based or based on any other suitable protocol. In FIG. 7, the field instrument 112 includes a radio capability provided by an adapter device 120. The adapter device 120 may have been installed after manufacture of the field instrument of concurrent with manufacture of the field instrument 112. ISA100.11a communications 704 are based on the inter-processor communications. In addition, a communication link between a HART interface object 708 and the field device database 710 can be based on the inter-processor communications 706.

In the example illustrated in FIG. 8, an interface object accesses a field device database 810 using HART commands. In FIG. 8, the field instrument 112 includes a radio capability provided adapter device 120. ISA100.11a communications 804 are based on the inter-processor communications. However, a HART interface object 808 can access the field device database 810 via HART-based commands, without the need for a physical connection as shown in the example of FIG. 6 and without inter-processor communications as shown in the example of FIG. 7.

Using these techniques, existing HART-based or other field devices can be efficiently evolved to ISA100.11a or other wireless devices. This promotes the use of the ISA100.11a or other wireless standard in existing industrial facilities and with field devices manufactured without wireless capabilities.

Although FIGS. 6 through 8 illustrate examples of techniques for accessing data from a field device using a HART command set, various changes may be made to FIGS. 5 through 7. For example, the interface 120 could be used to support both configuration/monitoring of a field device and provisioning of the field device onto a wireless network in any other suitable manner.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
coupling an adapter device to a field device in an industrial control system to provide a wireless communication capability to the field device;
converting, by the adapter device, information from a first protocol native to the field device into a second protocol native to a wireless network, wherein the converting comprises using a mapping of object types of the first protocol to object types of the second protocol, the object types of the second protocol including input and output object types, wherein the object types of the second protocol include analog input (AI), analog output (AO), digital input (DI), and digital output (DO) object types, and wherein the object types of the first protocol include primary variable (PV), secondary variable (SV), tertiary variable (TV), and quaternary variable (QV) object types; and
transmitting the information to at least one other device over the wireless network,
wherein the mapping allows the object types of the first protocol, from the field device, to be published and shared amongst devices on the wireless network including the at least one other device, and
wherein the mapping allows the publishing and sharing of object types amongst the devices on the wireless network using one or more peer-to-peer publisher-subscriber services.

2. The method of claim 1, wherein the second protocol comprises an International Society of Automation (ISA) 100.11a protocol.

3. The method of claim 1, wherein the first protocol comprises a Highway Addressable Remote Transducer (HART) protocol.

4. The method of claim 1, wherein at least one of the object types of the second protocol provides remote access over the wireless network to an interface of the field device.

5. The method of claim 1, further comprising:
receiving, at the adapter device, second information over the wireless network;
converting, by the adapter device, the second information from the second protocol into the first protocol; and
transmitting the second information to the field device.

6. An apparatus comprising:
a memory configured to store a mapping of object types of a first protocol to object types of a second protocol; and
at least one processor configured to:
control a first interface to communicate with a field device in an industrial control system;
control a second interface to communicate with at least one other device over a wireless network;
convert information from the first protocol native to the field device into the second protocol native to the wireless network; and
transmit, via the second interface, the information to the at least one other device over the wireless network,
wherein the at least one processor is configured to convert the information using the mapping of the object types of the first protocol to the object types of the second protocol, the object types of the second protocol including input and output object types,
wherein the object types of the second protocol include analog input (AI), analog output (AO), digital input (DI), and digital output (DO) object types,
wherein the object types of the first protocol include primary variable (PV), secondary variable (SV), tertiary variable (TV), and quaternary variable (QV) object types,
wherein the mapping allows the object types of the first protocol, from the field device, to be published and shared amongst devices on the wireless network including the at least one other device, and
wherein the mapping allows the publishing and sharing of object types amongst the devices on the wireless network using one or more peer-to-peer publisher-subscriber services.

7. The apparatus of claim 6, wherein the second protocol comprises an International Society of Automation (ISA) 100.11a protocol.

8. The apparatus of claim 6, wherein the first protocol comprises a Highway Addressable Remote Transducer (HART) protocol.

9. The apparatus of claim 6, wherein at least one of the object types of the second protocol provides remote access over the wireless network to an interface of the field device.

10. The apparatus of claim 6, wherein the at least one processor is further configured to obtain second information transmitted over the wireless network, convert the second information from the second protocol into the first protocol, transmit the second information to the field device via the first interface.

11. The apparatus of claim 6, wherein the apparatus is configured to support the second protocol to provide a wireless communication capability to a legacy field device that lacks an ability to communicate wirelessly.

12. A system comprising:
a field device in an industrial control system; and an adapter device coupled to the field device, the adapter device configured to provide a wireless communication capability to the field device, the adapter device comprising:
- a first interface configured to communicate with the field device;
- a second interface configured to communicate with at least one other device over a wireless network; and
- a controller configured to convert information from a first protocol native to the field device into a second protocol native to the wireless network and to transmit, via the second interface, the information to the at least one other device over the wireless network;

wherein the controller is configured to convert the information using a mapping of object types of the first protocol to object types of the second protocol, the object types of the second protocol including input and output object types, wherein the object types of the second protocol include analog input (AI), analog output (AO), digital input (DI), and digital output (DO) object types, wherein the object types of the first protocol include primary variable (PV), secondary variable (SV), tertiary variable (TV), and quaternary variable (QV) object types, wherein the mapping allows the object types of the first protocol, from the field device, to be published and shared amongst devices on the wireless network including the at least one other device, and wherein the mapping allows the publishing and sharing of object types amongst the devices on the wireless network using one or more peer-to-peer publisher-subscriber services.

13. The system of claim 12, wherein:
the second protocol comprises an International Society of Automation (ISA) 100.11a protocol.

14. The system of claim 12, wherein:
the first protocol comprises a Highway Addressable Remote Transducer (HART) protocol.

15. The system of claim 12, wherein at least one of the object types of the second protocol provides remote access over the wireless network to an interface of the field device.

16. A non-transitory computer readable medium containing computer readable program code that, when executed by at least one processing device, causes the at least one processing device to:
- obtain information from a field device in an industrial control system;
- convert the information from a first protocol native to the field device into a second protocol native to a wireless network, wherein the converting comprises using a mapping of object types of the first protocol to object types of the second protocol, the object types of the second protocol including input and output object types, wherein the object types of the second protocol include analog input (AI), analog output (AO), digital input (DI), and digital output (DO) object types, and wherein the object types of the first protocol include primary variable (PV), secondary variable (SV), tertiary variable (TV), and quaternary variable (QV) object types; and
- initiate transmission of the information to at least one other device over the wireless network, wherein the mapping allows the object types of the first protocol, from the field device, to be published and shared amongst devices on the wireless network including the at least one other device, and wherein the mapping allows the publishing and sharing of object types amongst the devices on the wireless network using one or more peer-to-peer publisher-subscriber services.

* * * * *